US009553757B1

(12) United States Patent
Roth (10) Patent No.: US 9,553,757 B1
(45) Date of Patent: Jan. 24, 2017

(54) SUBSTITUTION OF REQUESTS OR RESULTS IN ACCESS CONTROL SYSTEMS (71) Applicant: Amazon Technologies, Inc., Reno, NV (US)

(72) Inventor: Gregory Branchek Roth, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

(21) Appl. No.: 13/899,360

(22) Filed: May 21, 2013

(51) Int. Cl.
G06F 15/173 (2006.01)
H04L 29/08 (2006.01)
H04L 29/06 (2006.01)

(52) U.S. Cl.
CPC ........... H04L 29/08 (2013.01); H04L 63/0227 (2013.01); H04L 63/0272 (2013.01); H04L 63/20 (2013.01)

(58) Field of Classification Search
CPC ... H04L 63/0272; H04L 63/0227; H04L 63/20
USPC ....................................................... 709/225
See application file for complete search history.

(56) References Cited

U.S. PATENT DOCUMENTS

| 8,782,744 | B1* | 7/2014 | Fuller | H04L 63/10 709/225 |
| 2006/0259977 | A1* | 11/2006 | Patrick | G06F 21/6245 726/26 |
| 2009/0288150 | A1* | 11/2009 | Toomim | G06F 21/6218 726/5 |
| 2011/0113484 | A1* | 5/2011 | Zeuthen | 726/19 |

* cited by examiner

Primary Examiner — Richard G Keehn
(74) Attorney, Agent, or Firm — Hogan Lovells US LLP (57) ABSTRACT Approaches are described for allowing an access control policy to specify that a substitute operation be executed when a request for access matches certain conditions specified in the access control policy (e.g., when the identity of the requestor matches a specified identity in the policy). For example, the access control may specify that a substitute result should be provided to a requestor in response to a request for access or a substitute request should be executed instead of executing the received request and the results of the substitute request should be provided to the requestor in response to the request. The substitute result or the result of the substitute request may appear to the requestor as though their original request for access succeeded but the content of the result may be different than what would have been generated if the access control policy allowed the request to proceed.

20 Claims, 9 Drawing Sheets

SUBSTITUTION OF REQUESTS OR RESULTS IN ACCESS CONTROL SYSTEMS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, the customer or provider can utilize one or more access control policies that can be used to indicate which requests requiring access to those resources should be allowed, and which should be denied. However, in certain situations, merely allowing or denying a request may not capture the intent of the customer for whom the resources have been provisioned. In those situations, it may be advantageous to enable the policy to specify additional actions that may be performed upon its evaluation.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing access to various resources, such as data, services, computing resources and others. In particular, various embodiments enable an access control policy to specify that a substitute operation be executed when a request for access matches certain conditions specified in the access control policy (e.g., when the identity of the requestor matches a specified identity in the policy). For example, the access control may specify that either (1) a substitute result should be provided to the requestor in response to the request; or (2) a substitute request should be executed instead of executing the received request and the results of the substitute request should be provided to the requestor in response to the request. The substitute result or the result of the substitute request may appear to the requestor as though their original request for access succeeded but the content of the result may be different than what would have been generated if the access control policy allowed the request to proceed.

In accordance with an embodiment, the access control policy may be specified by a user, such as an account owner, for controlling access to resources associated with the account. The resources may include documents, databases, services and various other resources. The access control policy may be specified by using a policy language that includes semantics for expressing the effect of the access control policy, including the semantics for specifying the substitute results or substitute requests. The access control policy may either contain the substitute result/request or contain instructions used to generate the substitute request/result. The access control policy may further include one or more conditions that are to be applied when evaluating the policy against requests for access. Once the user specifies the access control policy, the access control policy may be persisted, such as by storing in an access control database or other storage location.

When a request (e.g., application programming interface (API)) request is received from a client to access a resource, a policy evaluation engine may retrieve the access control policy and evaluate the policy to determine whether the request satisfies the conditions specified in the access control policy. If the request matches the set of conditions specified in the policy, the policy evaluation engine may cause either the substitution result to be returned to the requestor or the substitution request to be executed in place of the original request submitted by the client. For example, if the client is requesting access to a document containing sensitive information, a redacted version of the document may be provided as a response to the request. Similarly, if the client is requesting list the contents of a particular database, the request may be replaced with a request to display the contents of the database with a set of filters applied that remove the sensitive information from the display. In this manner, rather than outright rejecting certain requests, a more flexible approach is provided, where the requestor is provided access to resources that appear to be the requested resources and the request is made to appear as though it was successfully executed.

In various embodiments, the request/result substitution as described herein can be utilized in a multitenant and/or shared resource environment, often referred to as a cloud computing environment. Conventionally, in this type of environment, a user (e.g., customer) may create an account with a service provider (e.g., cloud computing provider) or other operator of the multitenant environment to obtain access to the resources of the service provider. The service provider may provision various resources for the account in order to host applications, data and other services on behalf of the user. For example, the service provider or other operator may maintain a set of host computing devices which utilize virtualization technology to provision one or more virtual machines for the user. These virtual machine instances can be hosted on the host computing device using a hypervisor (or other virtualization technology) and each virtual machine instance can contain a guest operating system, including a kernel, device drivers and other OS components. The host computing devices and other physical resources to host the virtual computing devices may reside in a resource center, such as a data center, server farm, or the like.

In this environment, the user (e.g., account owner) may create one or more access control policies for controlling access to the resources (e.g., databases, services, virtual machines, etc.) of their account within the multitenant environment. As part of creating the access control policy, the user may specify substitute results that should be provided or substitute requests that should be executed when requests are received that meet certain conditions. These substitute results and substitute requests can lead any unauthorized requestor to believe their requests executed successfully, without providing access to sensitive data and other private services of the user.

Figure 1:
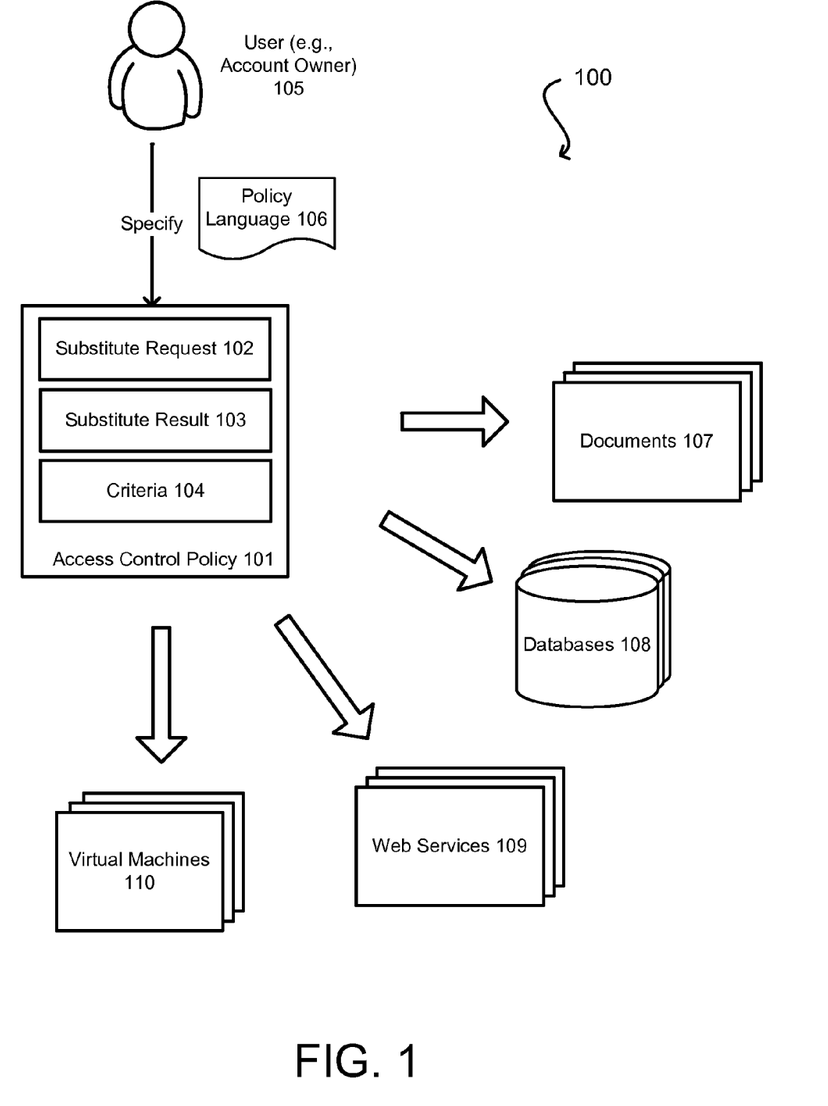
FIG. 1 illustrates an example of a user specifying an access control policy, in accordance with various embodiments.

FIG. 1 illustrates an example 100 of a user specifying an access control policy, in accordance with various embodiments. As shown in the illustration, the user 105, such as an owner of an account, may use a policy language 106 to specify an access control policy 101 for controlling access to the resources associated with the account. The policy language 106 may include the necessary constructs (e.g., semantics etc.) to enable the user 105 to specify the actions that should be performed when an authorization request meets certain criteria. Once created, the access control policy 101 may be used to control access to any number of resources, including but not limited to documents 107, databases 108, web services 109 and virtual machines 110.

In the illustrated embodiment, the access control policy 101 may specify a substitute request 102 or substitute result 103 that should be applied by a policy evaluation engine when evaluating certain incoming authorization requests. For example, in one embodiment, the user 105 may specify that when an authorization request meets criteria 104, a substitute request 102 should be executed in place of the original authorization request. The substitute request 102 may replace an operation or a resource with a different operation or resource. For example, if the original authorization request is received from a particular user (e.g., "Bob"), the policy evaluation engine may intercept the original request, modify the original request to produce a second (different) request, and cause the second request to be executed in place of the original request. The response to the second request can then be returned to the user, making the response appear to have come as a result of executing the original request. Alternatively, rather than modifying the original request, the policy engine may cause an entirely new request or several requests to be issued, as defined in the access control policy 101.

In another embodiment, the user 105 may specify that when an authorization request meets the set of criteria 104, a substitute result 103 should be returned as a response to the authorization request. The entire content of the substitute result 103 may be defined by the access control policy 101. For example, if the request to access a sensitive document is received from an unauthorized user, the substitute result 103 may provide a document that does not contain the sensitive data (e.g., a redacted version of the document, or a different document altogether).

The criteria 104 specified in the access control policy 101 may be based on a particular principal (e.g., user or group of users), or attributes of a principal, or may be based on particular runtime conditions (e.g., time of day), or attributes of the request (e.g., IP address), or may be used in the context of any other decisional context within the policy language 106.

In various embodiments, the effect of returning the substitute result 103 or the result of a substitute request 102 is to lead any unauthorized requestor to believe that the requestor had retrieved all of the information that was available and that the request executed successfully. Some requestors may receive an error message, while other requestor may receive a message pretending to be a successful response, depending on the criteria 104 specified in the access control policy.

The substitution of such results and requests enables a number of distinct use cases. One possible use case is to replace read (or write) operations directed to a data resource (e.g., document, database, etc.) containing sensitive information with read (or write) operations directed to an alternate data resource. This means that an unauthorized requestor is not able to determine that a different result was provided than what the requestor intended to get. In another use case, attempts to display particular data content may be replaced with displaying the content with a set of filters applied. These filters may remove or block certain portions of the content that are deemed sensitive.

In the context of multitenant and/or virtualized computing environments, the substitute requests and substitute results may be used to manipulate virtualized resources, such as virtual machines. For example, a request from a particular user to terminate a virtual machine instance may be replaced with a substitute request to suspend the virtual machine instance. As another example, a request to launch a virtual machine instance of a first type or configuration may be modified to launch an instance of a different type of configuration. In another use case, a request to modify one security group may cause modifications to a different security group. In some embodiments, a request may become more than one request. This may be used to cause changes in a first environment to be mirrored (copied) to a second environment. Thus, a request to perform a write operation on one resource may be replaced with two requests, where the second request performs the copy operation to the second environment, opaquely with respect to the user.

A policy language 106 may be used to create the access control policy 101 that specifies a substitute result to be provided to a particular request or a substitute request to be executed in place of a particular request. As such, the policy language 106 may include semantics to express an "effect" of an access control policy 101 when a request matches the set of criteria or conditions specified in the access control policy. For example, a user may write a statement in the policy language, such as "{principal: Bob, effect: replace: {'resource':'/pointless-document'}, action: s3:get, resource: s3:/secret-document}." In this example, when the principal "Bob" submits a "get" request to obtain the resource "secret-document," the effect of the access control policy will be to replace the result of the request with a substitute result called "pointless-document." Thus, if the user "Bob" were to submit such a request, the policy evaluation engine would evaluate the policy and return the substitute resulting document as a response to the request. In some embodiments, the substitute result may be returned along with an indication of success, such that the client would not readily realize that a different result was provided.

Figure 2A:
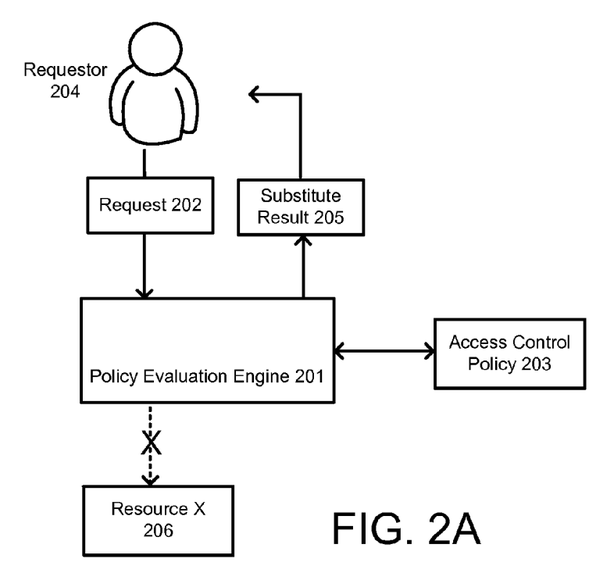
FIG. 2A illustrates an example of a policy evaluation engine returning a substitute result to a requestor, in accordance with various embodiments.
Figure 2B:
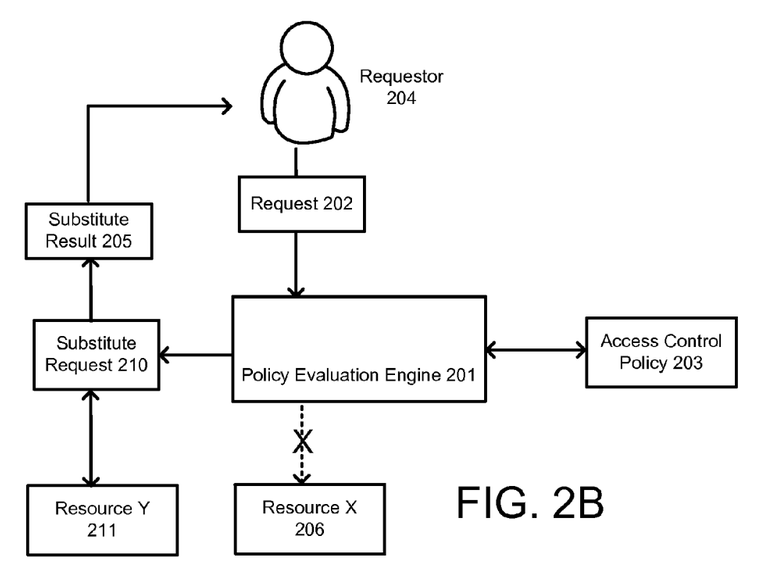
FIG. 2B illustrates an example of a policy evaluation engine causing a substitute request to be executed in place of an original request, in accordance with various embodiments.

FIGS. 2A and 2B illustrate examples where a policy evaluation serves as a front end for receiving requests and either providing substitute results to the requestor or executing substitute requests. In particular, FIG. 2A illustrates an example of a policy evaluation engine returning a substitute result to a requestor, in accordance with various embodiments. As shown in the illustration, a requestor 204 submits a request 202 to access a particular resource X 206, such as a database, document, service or any other resource. In response to receiving the request, the policy evaluation engine 201 inspects the context information of the request 202 and retrieves all access control policies relevant to the request 202, such as access control policy 203.

In the illustrated embodiment, the access control policy 203 specifies that if the request 202 matches the criteria specified in the access control policy 203, the policy evaluation engine 201 should return a substitute result 205 in response to the request 202 and abort execution of the request 202. The contents of the substitute result 205 may be defined by the access control policy 203. If the request 202 matches the specified criteria, the policy evaluation engine 201 returns the substitute result 205, rather than allowing the request to access resource 206.

FIG. 2B illustrates an example of a policy evaluation engine causing a substitute request to be executed in place of an original request, in accordance with various embodiments. As shown in the illustration, the requestor 204 submits a request 202 to access resource 206 and the policy evaluation engine 201 evaluates access control policy 203, as previously described with reference to FIG. 2A. In FIG. 2B, however, the access control policy 203 specifies that if the request 202 meets the criteria specified in access control policy 203, the policy evaluation engine 201 should execute a substitute request 210 instead of request 202.

In the illustrated embodiment, if the request 202 matches the specified criteria, the policy evaluation engine 201 causes the substitute request 210 specified in the access control policy 203 to be executed. In some embodiments, the substitute request 210 may be executed against a different resource (e.g., resource Y 211) than the resource 206 requested by the original request 202. In other embodiments, the substitute request 210 may be executed against the same resource, but with modified functionality, as specified in the access control policy 203. The results 205 of the substitute request 210 is then returned to the requestor 204 in response to the original request 202. In some embodiments, an indication may be provided to the requestor 204, indicating that the original request 202 has been executed successfully, in order to prevent the requestor (e.g., unauthorized requestor) from detecting that a different request was executed.

Figure 3A:
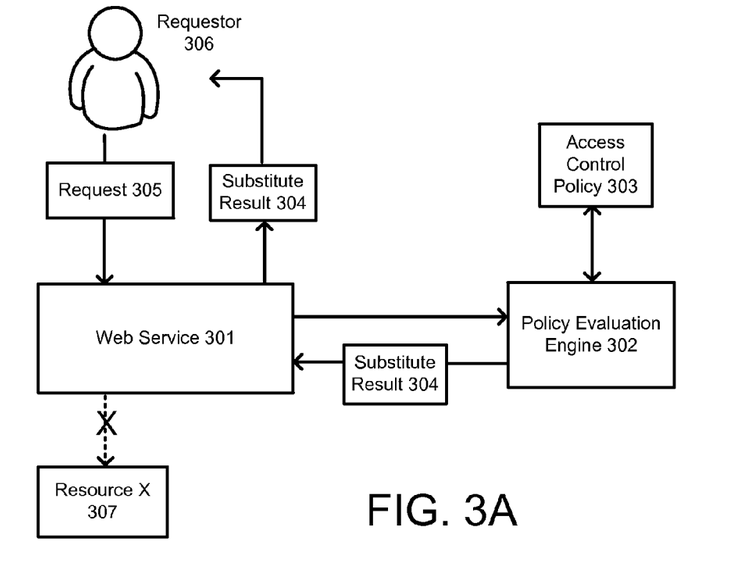
FIG. 3A illustrates an example of a policy evaluation engine providing a substitute result to be returned to the client by a web service, in accordance with various embodiments.
Figure 3B:
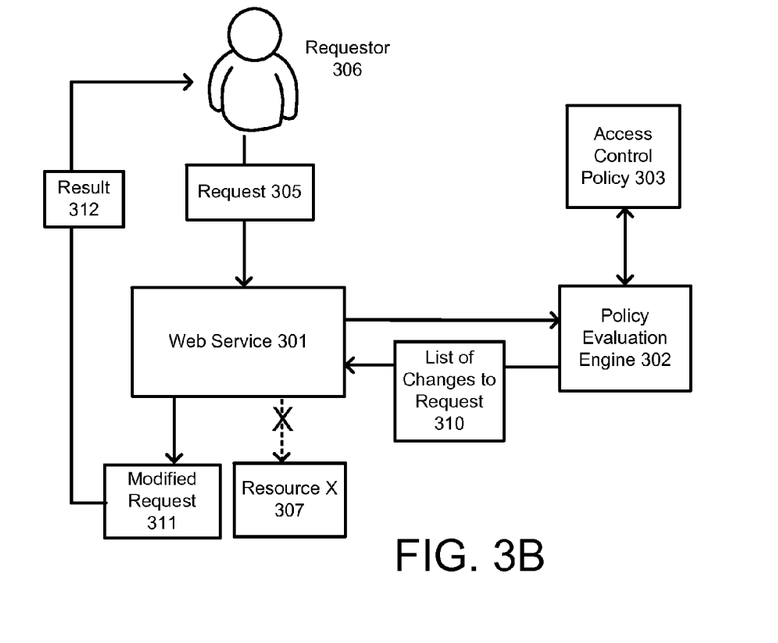
FIG. 3B illustrates an example of a policy evaluation engine returning a list of changes to be applied to a request, in accordance with various embodiments.

FIGS. 3A and 3B illustrate several examples of a policy evaluation engine used by a web service in order to provide a requestor with a substitute result or execute an alternate request. In particular, FIG. 3A illustrates an example of a policy evaluation engine providing a substitute result to be returned to the client by a web service, in accordance with various embodiments. The web service 301 may be provided by a service provider or other operator of a multitenant computing environment, as described throughout this disclosure. As shown in the illustration, a requestor 306 submits a request 305 to a web service 301 to access a particular resource 307, such as a database, document, or the like. The web service 301 receives the request 305 and retrieves or causes to be retrieved relevant policy information, such as access control policy 303 based on the context information associated with the request. The policy information is loaded along with some request context into a policy evaluation engine 302 and the policy evaluation engine 302 evaluates the information derived from the request 305 and information derived from the requestor 306.

In the illustrated embodiment, the access control policy 303 specifies that if a request 305 matches certain criteria, then an alternate result should be returned to the requestor in response to the original request 305. As such, when the policy evaluation engine 302 is loaded with the access control policy 303, the policy evaluation engine evaluates the policy 303 and determines whether request 305 matches the criteria specified in the access control policy 303. If the request matches the criteria, the policy evaluation engine provides a substitute result 304 to the web service 301, to be returned back to the requestor 306 in response to the request 305.

FIG. 3B illustrates an example of a policy evaluation engine returning a list of changes to be applied to a request, in accordance with various embodiments. As shown in the illustration, the requestor 306 provides request 305 to access resource 307 to a web service 301, as previously described with reference to FIG. 3A. In FIG. 3B, however, the access control policy 303 specifies that for any requests matching certain criteria, an alternate request should be executed. When the policy evaluation engine 302 determines that request 305 matches the specified criteria, the policy evaluation engine 302 provides to the web service 301 a list of changes 301 to be made to the request. For example, the list of changes may include replacing a target resource (e.g., database, document, etc.) specified in the original request 305 with a different resource (e.g., different database, different document, etc.). The web service 301 then modifies the request accordingly and causes the modified request 311 to be executed. The result 312 of the modified request 311 is then provided back to the requestor 306 in response to the request 305. In alternative embodiments, the policy evaluation engine may directly invoke the substitute request or may directly modify the original request, as previously described.

Figure 4:
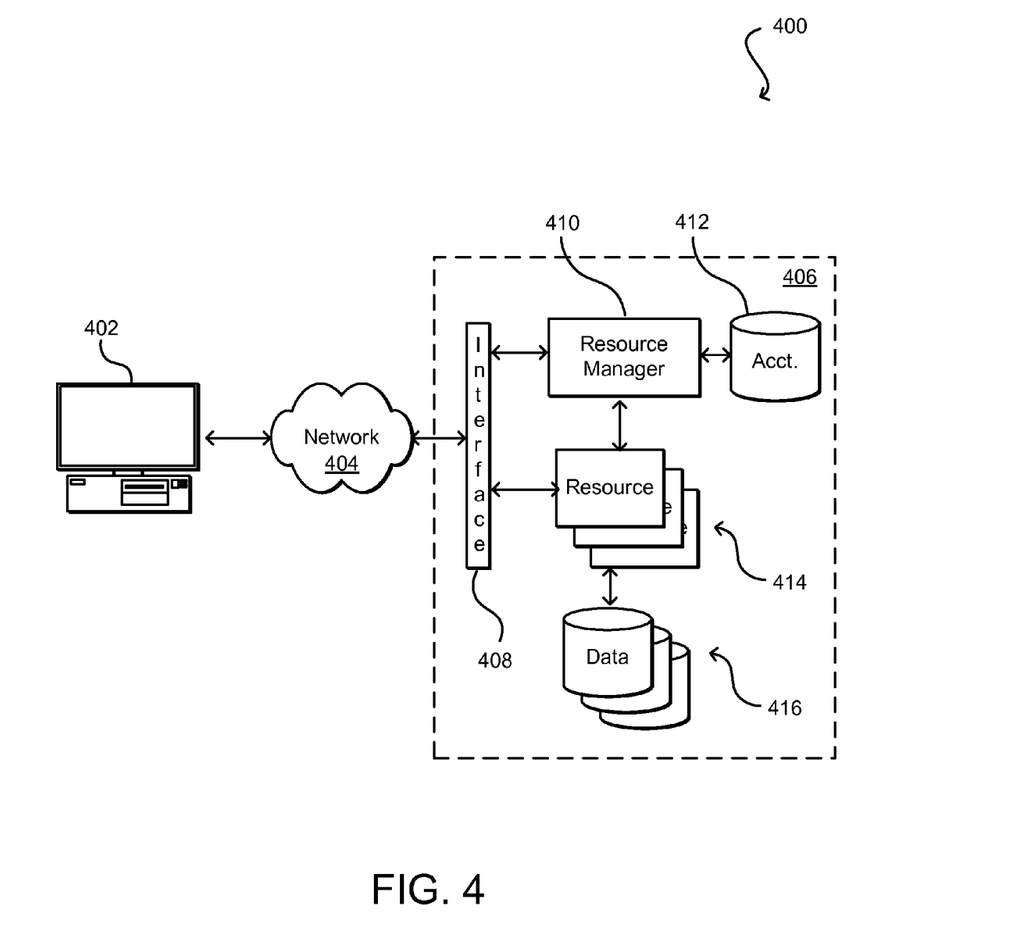
FIG. 4 illustrates an example environment in which aspects of the various embodiments can be implemented.

FIG. 4 illustrates an example environment 400 in which aspects of the various embodiments can be implemented. In this example a user (e.g., customer) of a multi-tenant environment 106 is able to utilize a client device 402 to submit requests across at least one network 404 to at least one designated address or interface of the multi-tenant environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The multi-tenant environment 406 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the multi-tenant environment that indicates which resources or types of resources the customer can access, an amount of that access, types of tasks that can be performed with that access, or other such terms. One or more users might be associated with the customer, and thus can be able to access the resources per the customer account.

In various embodiments, the environment 406 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant environment is often referred to as resource sharing, Web services, or "cloud computing," among other such terms and depending upon the specific environment and/or implementation. In this example the multi-tenant environment includes a plurality of resources 414 of one or more types. These types can include, for example, application servers operable to process instructions provided by a user or database servers operable to process data stored in one or more data stores 416 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 414 can submit a request that is received to an interface layer 408 of the multi-tenant environment 406. The interface layer can include application programming interfaces (APIs) or other exposed interfaces enabling a user to submit requests to the multi-tenant environment. The interface layer 408 in this example can also include other components as well, such as at least one Web server, routing components, load balancers, and the like. When a request to provision a resource is received to the interface layer 408, for example, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account, or is associated with a customer having an existing account, with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, the customer. The servers of the Web services layer can be stateless and scaled horizontally as known in the art. API servers, as well as the persistent data store, can be spread across multiple data centers in a region, for example, such that the servers are resilient to single data center failures.

As mentioned, however, certain customers might want more assurance that requests received to a distributed environment are properly evaluated, such that only requests meeting certain criteria are able to access resources or services associated with that customer. The customer may also wish to express the permissions and access criteria using a policy language that is suited for their organization. As such, in various embodiments, a policy language can be provided by a service provider or other operator of the multitenant environment 106 for expressing one or more access control policies. These access control policies can be persisted and used to control access to the various resources, as previously described. The policy language may be used to create an access control policy and may include the semantics to express an "effect" of an access control policy, when a request matches the set of criteria or conditions specified in the access control policy.

Figure 5:
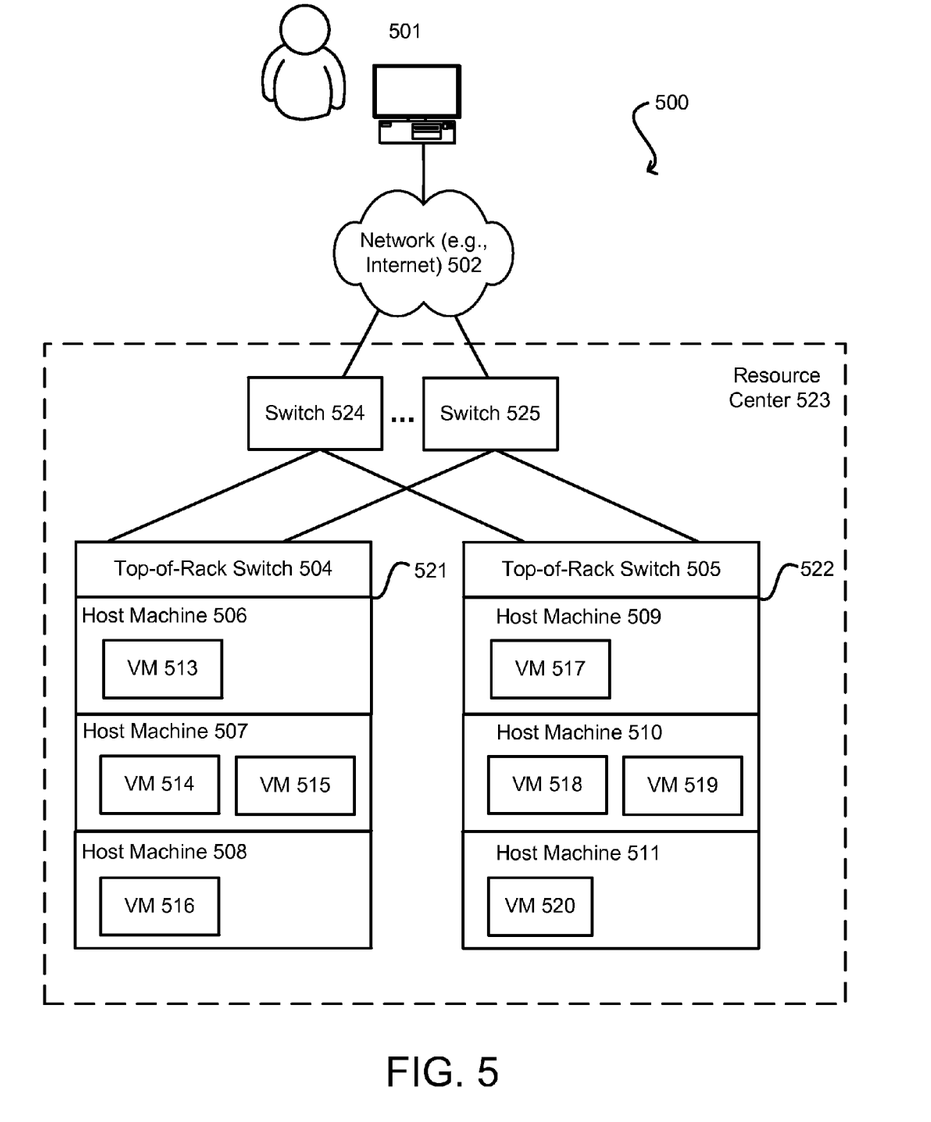
FIG. 5 illustrates an example of a resource center environment of a service provider or other operator of the multitenant computing environment, in accordance with various embodiments.

FIG. 5 illustrates an example 500 of a resource center environment of a service provider or other operator of the multitenant computing environment, in accordance with various embodiments. In the illustrated embodiment, a service provider (e.g., a cloud computing resource provider) can maintain one or more resource centers 523 (e.g., data centers, server farms, etc.) that store the physical resources (e.g., host computing devices, etc.) of the service provider. These physical resources can be used to host a number of virtual machine instances or virtual servers that can be provided to users 501 over a network 502, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 523 of the service provider may include one or more racks 521, 522 of host computing devices (506, 507, 508, 509, 510) wherein each host computing device on a particular rack is connected to a single top-of-rack (TOR) switch (504, 505). These TOR switches can be further connected to one or more other switches (524, 525) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (513, 514, 515, 516, 517, 518, 519, 520) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider.

Figure 6:
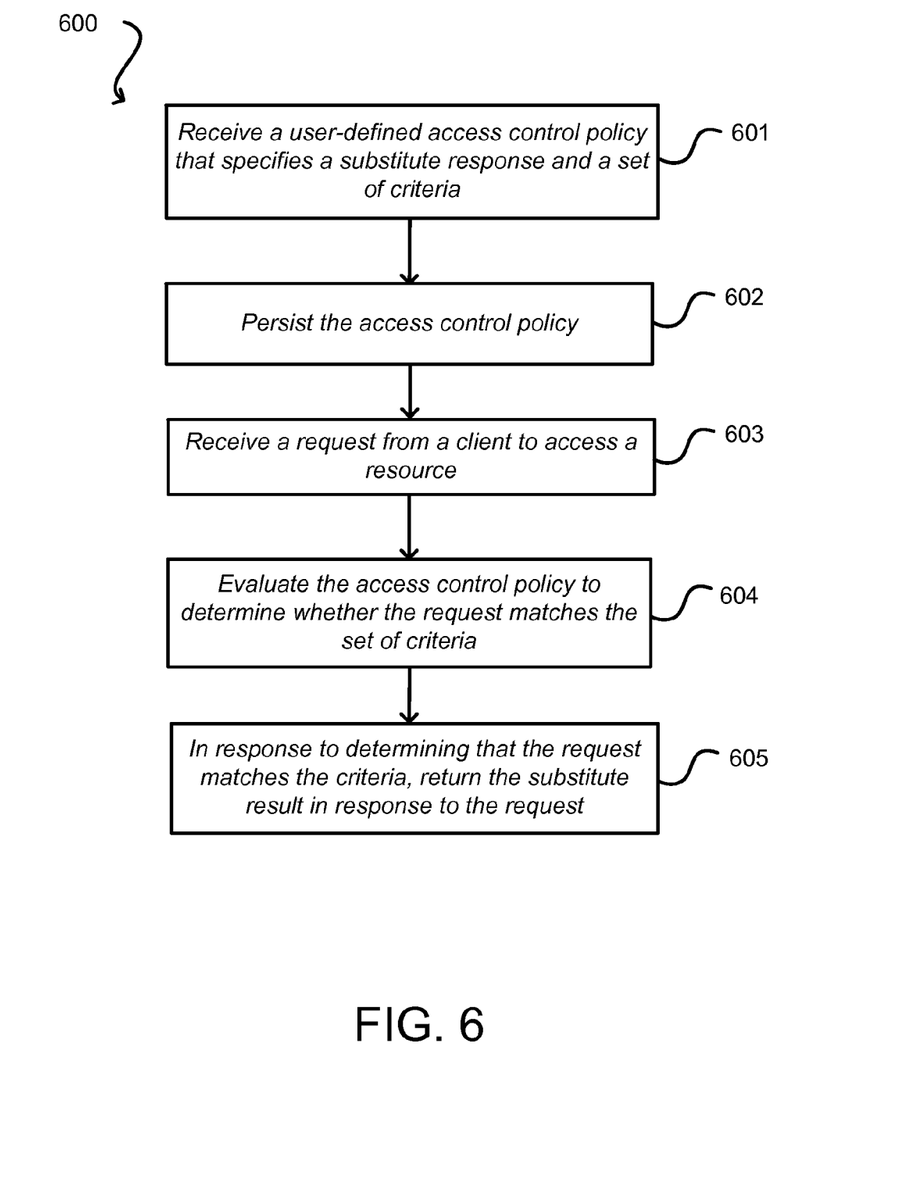
FIG. 6 illustrates an example process for returning a substitute result in response to an original request for access, in accordance with various embodiments.

FIG. 6 illustrates an example process 600 for returning a substitute result in response to an original request for access, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 601, the user specifies an access control policy that is used to control access to one or more resources. For example, the access control policy may control access to databases, services, virtual machines or other resources provided by a service provider or other operator of a multitenant computing environment, as previously described. In this operation, the access control policy specifies a substitute result and a set of criteria to be evaluated against requests for access. The substitute result may be any data set or other information that is to be returned to the client if the request matches the criteria specified in the access control policy.

In operation 602, the access control policy is persisted, such as by storing the access control policy in a policy database or other such structure. In some alternative embodiments, the access control policy may not need to be persisted by storing it in a database, but may be directly applied by the policy evaluation engine. In operation 603, a request to access a resource is received from a client or other requestor. For example, the request may attempt to access a database containing sensitive information of a user that specified the access control policy. In operation 604, a policy evaluation engine evaluates the access control policy and determines whether the request matches the set of criteria specified in the access control policy. If the request matches the specified criteria, the policy evaluation engine returns a substitute result to the client, as shown in operation 605. For example, the substitute result may be an empty document or a document that does not contain any sensitive information requested in the original request.

Figure 7:
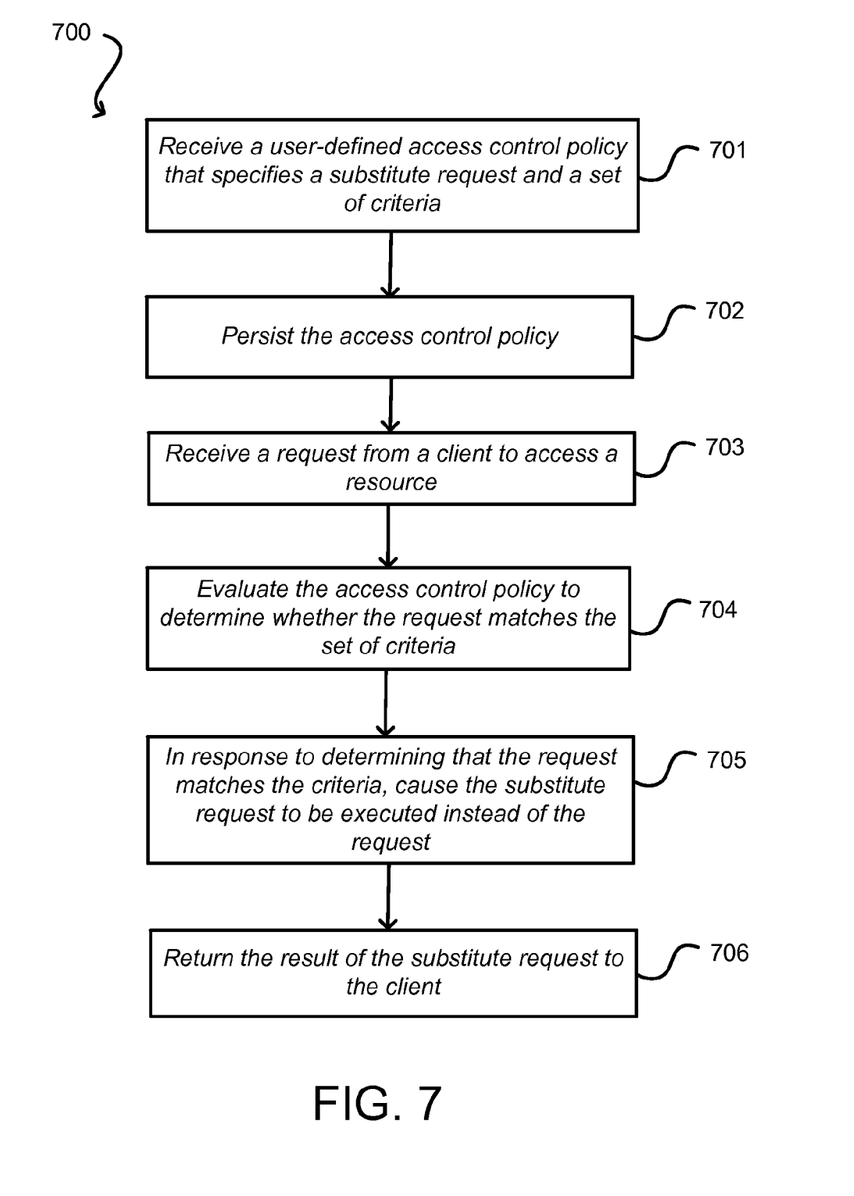
FIG. 7 illustrates an example of executing a substitute request in place of an original request, in accordance with various embodiments.

FIG. 7 illustrates an example 700 of executing a substitute request in place of an original request, in accordance with various embodiments. In operation 701, the user specifies the access control policy, as previously described. The access control may contain a set of criteria to be applied to the request and a substitute request that is to be executed when requests match the specified criteria. In operation 702, the access control policy is persisted, as previously described with reference to FIG. 6. Notably, in some embodiments, the access control policy may not need to be persisted by storing it in a database, but may be directly applied by the policy evaluation engine, as previously described.

In operation 703, a request for access is received from the client or other requestor. The policy evaluation engine retrieves all applicable access control policies and evaluates them against the request to determine whether the request satisfies the set of criteria specified in each policy. In operation 705, if the request matches the specified criteria, the substitute request specified in the access control policy is executed in place of the original request. In operation 706, the result of the substitute request is returned to the client or other requestor that submitted the original request.

Figure 8:
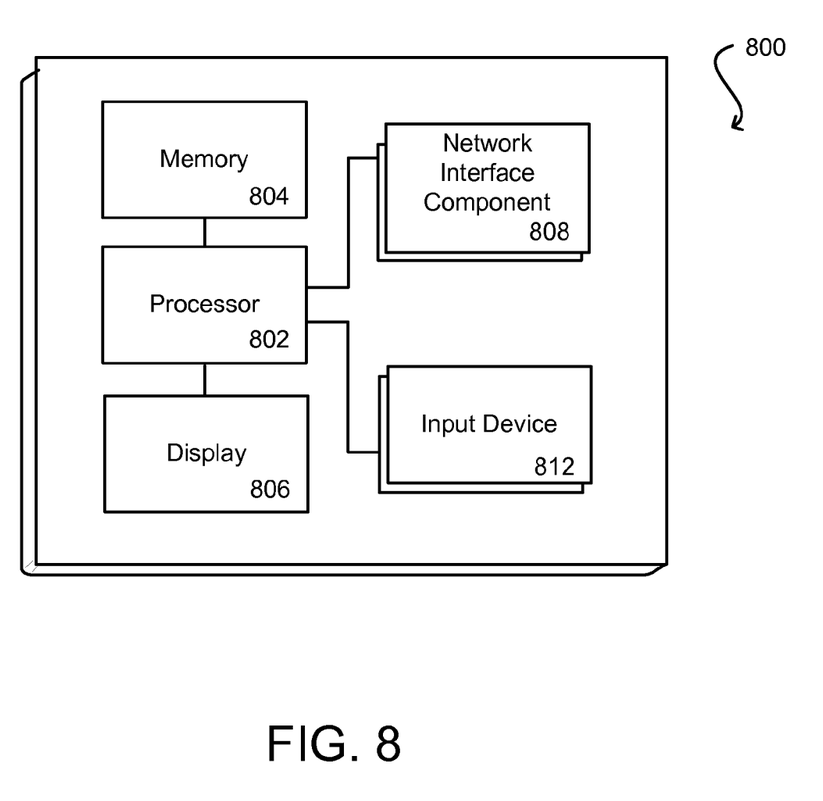
FIG. 8 illustrates a logical arrangement of a set of general components of an example computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
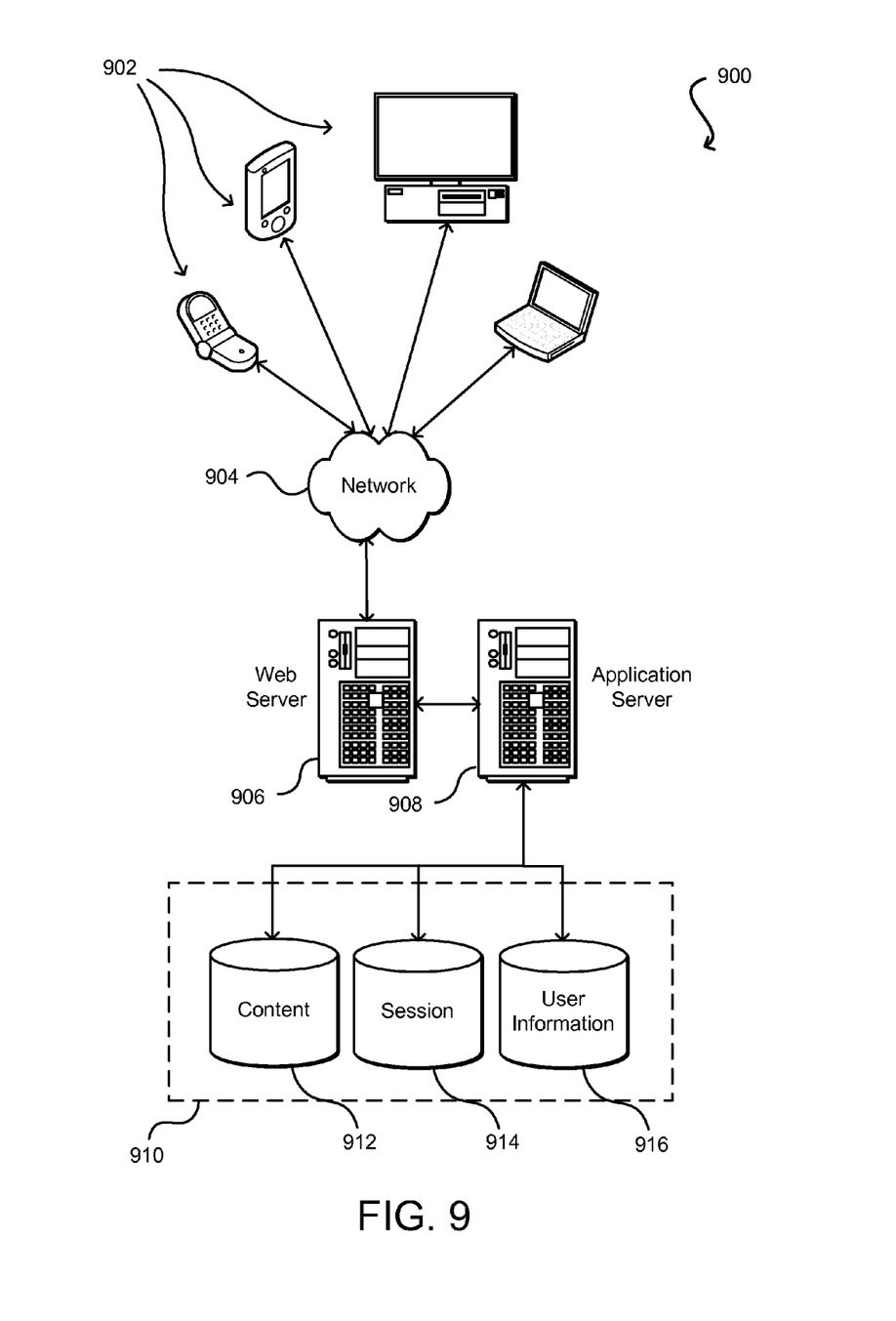
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for managing access to data resources, the method comprising:
receiving a user-defined access control policy for managing access to one or more data resources, the user-defined access control policy specifying one or more conditions and one of: a substitution result or a substitution request to be applied when the one or more conditions are satisfied;
receiving, from a client, an application programming interface (API) request to access the one or more data resources, the request being associated with an unfiltered result including all available information; and
evaluating the user-defined access control policy by a policy evaluation engine to determine whether the API request satisfies the one or more conditions specified in the user-defined access control policy;
wherein, in response to determining that the API request satisfies the one or more conditions, the policy evaluation engine is configured to:
cause the substitution result specified in the user-defined access control policy to be returned to the client in response to the API request, the substitution result comprising a filtered subset of the unfiltered result, or
cause the substitution request, specified in the user-defined access control policy, to be executed instead of the API request and a result of the substitution request to be returned to the client in response to the API request, the result of the substitution request comprising a filtered subset of the unfiltered result; and
return, separate from the filtered subset, an indication to the client in response to the API request, indicating that the API request has completed successfully with all unfiltered information pertinent to the API request.

2. The computer implemented method of claim 1, wherein causing the substitution request to be executed instead of the API request further comprises:
causing a read or write operation on a first data resource to be replaced with a read or write operation on a second data resource, wherein the second data resource is a redacted version of the first data resource.

3. A computer implemented method, comprising:
obtaining an access control policy specifying one or more conditions and one of: a substitution result or a substitution request to be applied when the one or more conditions are satisfied:
receiving, from a client, a request to access one or more resources, the request being associated with an unfiltered result including all available information;
evaluating the access control policy to determine whether the request satisfies the one or more conditions specified in the access control policy;
in response to determining that the request satisfies the one or more conditions specified in the access control policy, performing one of:
causing the substitution result specified in the access control policy to be returned to the client in response to the request, the substitution result comprising a filtered subset of the unfiltered result; or
causing the substitution request specified in the access control policy to be executed instead of the request, the result of the substitution request comprising a filtered subset of the unfiltered result; and
returning an indication to the client, separate from the filtered subset, that the request was executed successfully with all unfiltered information pertinent to the request.

4. The computer implemented method of claim 3, further comprising:
generating the substitution request based at least in part on the access control policy and the received request to access the one or more resources.

5. The computer implemented method of claim 4, wherein generating the substitute request further comprises replacing a first resource specified in the request to access the one or more resources with a second resource.

6. The computer implemented method of claim 3, wherein at least one of the substitution requests or the substitution result is embedded in the access control policy.

7. The computer implemented method of claim 3, further comprising:
determining an identity of the client that initiated the request to access the one or more resources; and
determining that the request satisfies the one or more conditions based at least in part on the identity of the client.

8. The computer implemented method of claim 3, wherein causing the substitution request to be executed further comprises performing at least one of:
replacing a read operation of a first resource with a read operation of a second resource;
replacing a write operation of the first resource with a write operation of the second resource;
replacing a request to list available resources with a request to list a predetermined fixed list of resources that is different from the list of available resources;
replacing a request to terminate a virtual machine with a request to suspend the virtual machine; or
replacing a request to launch a virtual machine of a first type with a request to launch a virtual machine of a second type.

9. The computer implemented method of claim 3, wherein causing the substitute request to be executed further comprises:
causing a read operation on a document to be replaced with a read operation on a redacted version of the document.

10. The computer implemented method of claim 3, wherein the request is an application programming interface (API) request received by a web service from a user over a network to access the one or more resources provisioned for the user in a multitenant computing environment.

11. A computing device, comprising:
at least one processor; and
memory including instructions that, when executed by the at least one processor, cause the computing device to:
obtain an access control policy specifying an identity and a substitute operation;
receive, from a client, a request to access one or more resources, the request being associated with an unfiltered result including all available information;
determine an identity of the client;
evaluate the access control policy to determine whether the identity of the client matches the identity specified in the access control policy;

in response to determining that the identity of the client matches the identity specified in the access control policy, execute the substitute operation specified in the access control policy, a result of the substitute operation comprising a filtered subset of the unfiltered result; and provide to the client an indication, separate from the filtered subset, indicating that the request was executed successfully with all unfiltered information pertinent to the request.

12. The computing device of claim 11, wherein executing the substitute operation further comprises:

returning a substitution result specified in the access control policy to the client in response to the request.

13. The computing device of claim 11, wherein executing the substitute operation further comprises:

generating the substitution request based at least in part on the access control policy and the received request to access the one or more resources.

14. The computing device of claim 13, wherein generating the substitute request further comprises replacing a first resource specified in the request to access the one or more resources with a second resource.

15. The computing device of claim 11, wherein executing the substitute operation further comprises performing at least one of:

replacing a read operation of a first resource with a read operation of a second resource;

replacing a write operation of the first resource with a write operation of the second resource;

replacing a request to list available resources with a request to list a predetermined fixed list of resources that is different from the list of available resources;

replacing a request to terminate a virtual machine with a request to suspend the virtual machine; or replacing a request to launch a virtual machine of a first type with a request to launch a virtual machine of a second type.

16. A non-transitory computer readable storage medium storing one or more sequences of instructions executed by one or more processors to:

obtain an access control policy specifying an identity and a substitute operation;

receive, from a client, a request to access one or more resources, the request being associated with an unfiltered result including all available information;

determine an identity of the client;

evaluate the access control policy to determine whether the identity of the client matches the identity specified in the access control policy;

in response to determining that the identity of the client matches the identity specified in the access control policy, execute the substitute operation specified in the access control policy, a result of the substitute operation comprising a filtered subset of the unfiltered result; and provide to the client an indication, separate from the filtered subset, indicating that the request was executed successfully with all unfiltered information pertinent to the request.

17. The non-transitory computer readable storage medium of claim 16, wherein executing the substitute operation further comprises:

returning a substitution result specified in the access control policy to the client in response to the request.

18. The non-transitory computer readable storage medium of claim 16, wherein executing the substitute operation further comprises:

generating the substitution request based at least in part on the access control policy and the received request to access the one or more resources.

19. The non-transitory computer readable storage medium of claim 18, wherein generating the substitute request further comprises replacing a first resource specified in the request to access the one or more resources with a second resource.

20. The non-transitory computer readable storage medium of claim 16, wherein executing the substitute operation further comprises performing at least one of:

replacing a read operation of a first resource with a read operation of a second resource;

replacing a write operation of the first resource with a write operation of the second resource;

replacing a request to list available resources with a request to list a predetermined fixed list of resources that is different from the list of available resources;

replacing a request to terminate a virtual machine with a request to suspend the virtual machine: or replacing a request to launch a virtual machine of a first type with a request to launch a virtual machine of a second type.

* * * * *